United States Patent [19]
Oshima et al.

[11] Patent Number: 4,526,934
[45] Date of Patent: Jul. 2, 1985

[54] BRANCHED STYRENE-BUTADIENE COPOLYMERS AND PNEUMATIC TIRES USING THE SAME

[75] Inventors: Noboru Oshima, Suzuka; Isamu Shimizu, Kameyama; Yoshito Yoshimura, Yokkaichi; Tatsuo Fujimaki, Higashimurayama; Seisuke Tomita, Tokorozawa, all of Japan

[73] Assignee: Bridgestone Tire Company Limited, Tokyo, Japan

[21] Appl. No.: 473,394

[22] Filed: Mar. 8, 1983

[30] Foreign Application Priority Data

Mar. 19, 1982 [JP] Japan .................................. 57-42955
Mar. 25, 1982 [JP] Japan .................................. 57-47946

[51] Int. Cl.$^3$ ............................................... C08F 8/42
[52] U.S. Cl. .................................. 525/332.9; 525/99; 525/315; 525/371
[58] Field of Search ...................... 525/99, 315, 332.9

[56] References Cited

U.S. PATENT DOCUMENTS 4,304,886 12/1981 Bean, Jr. et al. ..................... 525/315
4,311,803 1/1982 Smith et al. ........................... 525/315

FOREIGN PATENT DOCUMENTS 48619 3/1982 European Pat. Off. .
57-87407 5/1982 Japan .
985614 3/1965 United Kingdom .

Primary Examiner—Joseph L. Schofer
Assistant Examiner—Bernard Lipman
Attorney, Agent, or Firm—Sughrue, Mion, Zinn, Macpeak & Seas

[57] ABSTRACT

A branched styrene-butadiene copolymer and a pneumatic tire using the same as a tread base rubber are disclosed. This copolymer is produced by coupling an active styrene-butadiene copolymer anion, which is obtained by polymerizing styrene and butadiene in a hydrocarbon solvent in the presence of ether or a tertiary amine and an initiator of an organolithium compound, with a tin halide compound. In the copolymer, the ratio of branched copolymer connected with tin-butadienyl bond is at least 20% by weight, and the content of bound styrene is not less than 3% by weight but less than 25% by weight, and the content of vinyl bond in butadiene portion is not less than 30% but less than 50%.

4 Claims, No Drawings

BRANCHED STYRENE-BUTADIENE COPOLYMERS AND PNEUMATIC TIRES USING THE SAME

The present invention relates to branched styrene-butadiene copolymers and pneumatic tires using the same. More particularly, it relates to a branched styrene-butadiene copolymer having a low hysteresis loss and improved fracture properties and a pneumatic tire having improved high-speed durability and rolling resistance by using the branched styrene-butadiene copolymer as a tread base rubber in tires comprising a tread portion of a cap/base structure.

Lately, it has been strongly demanded to that rubber materials having a low hysteresis loss be employed as a rubber for tires to achieve reduction of fuel consumption in automobiles. As the rubber material having a low hysteresis loss, there have generally been used rubber blends of natural rubber or synthetic cis-1,4 polyisoprene with low or high cis-1,4 polybutadiene.

However, the above mentioned polybutadiene is not always sufficient in the hysteresis loss and fracture properties and causes a reversion phenomenon. In addition, the use of this polybutadiene brings about problems when blending with natural rubber or synthetic polyisoprene. Heretofore, it has been known that the reversion phenomenon can be solved by using polybutadiene with a middle to high vinyl content, but this polybutadiene is still insufficient in the hysteresis loss and fracture properties.

It is, therefore, a first object of the present invention to provide branched styrene-butadiene copolymer rubbers having a low hysteresis loss and improved fracture properties without causing the reversion phenomenon.

It is a second object of the present invention to considerably improve the rolling resistance and high-speed durability of pneumatic tires by using the aforementioned copolymer as a base rubber for the tread portion of a cap/base structure.

In one embodiment, the present invention relates to a a branched styrene-butadiene copolymer produced by coupling an active styrene-butadiene copolymer anion, which is obtained by polymerizing butadiene and styrene in the presence of ether or a tertiary amine and an initiator of an organolithium compound in a hydrocarbon solvent, with a tin halide compound, the improvement wherein:

(I) a ratio of branched polymer connected with tin-butadienyl bond in said copolymer is at least 20% by weight;

(II) a content of bound styrene in said copolymer is not less than 3% by weight but less than 25% by weight; and (III) a content of vinyl bond in the butadiene portion of said copolymer is not less than 30% but less than 50%.

In a second embodiment the present invention relates to a pneumatic tire comprising a toroidal carcass reinforcement, and a tread portion superimposed about a crown region of said carcass and having a cap/base structure of tread base rubber and tread cap rubber, the improvement wherein as said tread base rubber is a rubber composition containing at least 20 parts by weight of a branched styrene-butadiene copolymer rubber produced by coupling a styrene-butadiene copolymer anion with a tin halide compound, based on 100 parts by weight of the total rubber content.

The present invention will now be described in greater detail below.

In order to achieve the reduction of fuel consumption and the improvement of high-speed durability in tires as described above, it has been attempted to reduce heat build-up of the tire of hysteresis loss of the tire, especially the tire tread portion.

One method for the reduction of hysteresis loss, is to use materials having a low glass transition temperature such as high cis-1,4 polybutadiene and the like or materials having a high rebound resilience such as natural rubber and the like.

However, the use of these rubber materials extremely degrades wet braking performance, cornering stability on wet road or wet slalom, handling performance in high-speed running, and running stability such as braking performance or the like, so that it is very difficult to simultaneously accomplish these running stabilities with the low rolling resistance and high-speed durability.

Furthermore, it is known that the low rolling resistance and the wet skid resistance can be improved by optimizing the molecular structure of a polymer to be used in a single tread portion as disclosed in U.S. Pat. No. 4,334,567, but the improvement is still not satisfactory. This is because a styrene-butadiene copolymer rubber produced by solution polymerization using an organolithium compound is used alone, so that the breaking strength and elongation at breakage are low and many troubles are caused in the running of the tire or in the manufacture of the tire. That is, in large pneumatic tires to be mounted on truck, bus and the like, tread damages such as rib tear (rib breaking) and the like are produced during the running under high load and high deformation, while when the tire after vulcanization is taken out from a mold, molding defects are caused by damaging the tread with the pattern of the mold. The latter case is particularly conspicuous in tires for passenger cars having a complicated tread pattern. Therefore, it is difficult to satisfy all performances required for the tread portion with the single rubber composition in anyone of large tires for truck and bus and small tires for passenger cars.

In order to overcome these drawbacks, a so-called cap/base structure obtained by functionally separating the tread portion has been applied to not only large tires but also low fuel consumption tires for passenger cars as described, for example, in Japanese patent laid-open No. 55-99,403.

In the tread portion of such a cap/base structure, the running stability and resistance to tread damaging are sufficiently satisfied when the same rubber composition as used in the conventional single tread portion is used as a tread cap rubber. That is, a rubber composition consisting mainly of styrene-butadiene copolymer rubber is used as a tread cap rubber in tires for passenger cars, while natural rubber and/or polyisoprene rubber or a rubber blend of styrene-butadiene copolymer rubber therewith is used as a tread cap in large tires for truck and bus.

The inventors have made various studies with respect to a means for improving the low rolling resistance and high-speed durability of the pneumatic tire by effectively utilizing the cap/base structure without deteriorating the running stability and resistance to tread damaging such as rib tear of the like and found out that the low rolling resistance and high-speed durability of the tire are considerably improved by using a rubber composition containing styrene-butadiene copolymer rubber of particular molecular structure, natural rubber and polyisoprene rubber as a tread base rubber of the tread portion facing a breaker, and as a result the present invention has been accomplished.

In the styrene-butadiene copolymer according to the present invention, a content of bound styrene is not less than 3% by weight but less than 25% by weight, preferably not less than 3% by weight but not more than 15% by weight, more particularly 5 to 15% by weight, while a content of vinyl bond in butadiene portion is not less than 30% but less than 50%.

When the content of bound styrene is less than 3% by weight, fracture properties are poor, while when the content of bound styrene is not less than 25% by weight, the hysteresis loss is undesirably high. In the application of the copolymer to the tread base rubber of the pneumatic tire, the content of bound styrene is preferable to be not more than 15% by weight.

When the content of vinyl bond is less than 30%, not only the hysteresis loss is degraded due to the formation of block polystyrene, but also modulus and tensile properties lower in over vulcanization when blending with natural rubber, i.e. a so-called reversion phenomenon occurs. On the other hand, when the content of vinyl bond is not less than 50%, not only the fracture properties and wear resistance lower, but also the glass transition point rises, so that the heat build-up is poor.

The copolymer according to the present invention is characterized by containing at least 20% by weight of branched polymer connected with tin-butadienyl bond. In case of copolymers containing branched polymer connected with silicon-butadienyl bond or carbon-carbon bond other than tin-butadienyl bond, the improvement of hysteresis loss is not expected.

Furthermore, the fracture properties and hysteresis loss of the resulting copolymer vulcanizate are improved when tin-carbon bond in the branching of the copolymer is tin-butadienyl bond rather than tin-styryl bond.

When the ratio of branched polymer connected with tin-butadienyl bond is less than 20% by weight, the hysteresis loss is substantially equal to that of the well-known low cis-1,4 polybutadiene or high cis-1,4 polybutadiene, so that the object of the present invention cannot be achieved and also the processability is poor.

The copolymers according to the present invention are usually produced by polymerizing styrene and butadiene in the presence of ether or a tertiary amine and an initiator of an organolithium compound in a hydrocarbon solvent, adding 1 to 15 mole of 1,3-butadiene per 1 gram atom of lithium in the initiator to the resulting polymer and then coupling it with a tin halide compound.

The preferred copolymers according to the present invention are obtained by polymerizing styrene and butadiene under temperature conditions that the polymerization initiation temperature is 0°–50° C., the maximum access temperature is not more than 120° C. and the rising of polymerization temperature is at least 30° C. as a difference from the polymerization initiation temperature, adding a small amount of butadiene to change the terminal of the resulting polymer into butadienyllithium and then coupling with a tin halide compound. In the thus obtained copolymers, the content of vinyl bond in butadiene portion gradually reduces toward the terminal of the polymer and the butadiene portion at the branched connection is tin-1,4-butadienyl bond (Sn—C—C=C—C—), so that they are low in the viscosity during the kneading and excellent in the processability and also the vulcanizate therefrom is excellent in the hysteresis loss.

The content of vinyl bond in the molecular chain of the styrene-butadiene copolymer is determined by the amount of ether or tertiary amine in the polymerization system and the polymerization temperature. Since the amount of ether or tertiary amine in the polymerization system is usually constant, the distribution of the content of vinyl bone in the molecular chain of the copolymer is changed by the hysteresis of the polymerization temperature.

Moreover, the styrene-butadiene copolymer according to the present invention is a substantially random copolymer and is favorable that the content of block polystyrene in bound styrene is not more than 10% as measured by a method described by I. M. Kolthoff et al in J. Polymer Sci., Vol. 1, 429 (1946).

The Mooney viscosity of the copolymer is not particularly critical, but its $ML_{1+4}$ 100° C. is within a range of 20–150, preferably 40–80.

As the hydrocarbon solvent to be used in the production of styrene-butadiene copolymer, use may be made of hexane, heptane, cyclohexane, benzene, xylene and mixtures thereof. The organolithium compound includes, for example, alkyl lithiums such as n-butyllithium, sec-butyllithium, 1,4-dilithiobutane and the like and alkylene dilithiums, which is used in an amount of 0.02–0.2 part by weight per 100 parts by weight of the monomer.

Ether and tertiary amine are used as a randomization agent for styrene and butadiene as well as an adjusting agent for the microstructure of butadiene portion, a typical example of which includes dimethoxybenzene, tetrahydrofuran, dimethoxyethane, diethylene glycol dibutyl ether, diethylene glycol dimethyl ether, triethylamine, pyridine, N-methylmorpholine, N,N,N',N'-tetramethylethylene diamine, 1,2-diperidino ethane and the like.

The coupling reaction is performed at a temperature of 50° to 120° C. The tin halide compound is used in an amount of 0.2 to 3 equivalent of halogen atom per 1 equivalent of lithium atom existent in the terminal of the polymer.

As the tin halide compound, use may be made of tin tetrachloride, tin tetrabromide, tin methyl trichloride, tin butyl trichloride, bis(trichlorostannyl) ethane and the like.

The styrene-butadiene copolymer according to the present invention is used alone or in a blend with at least one rubber selected from natural rubber, synthetic cis-1,4 polyisoprene, emulsion polymerized styrene-butadiene copolymer, high cis-1,4 polybutadiene, low cis-1,4 polybutadiene, ethylene-propylene-diene terpolymer and the like for use in tires as well as rubber spring, belt, hose and other industrial goods. In this case, the copolymer or its rubber blend is extended with oil, added with additives usually used for vulcanizate and the vulcanized, if necessary.

When the branched styrene-butadiene copolymer according to the present invention is used as the tread base rubber in pneumatic tire, it is preferable that the tread base rubber contains at least 20 parts by weight of the branched copolymer having a content of bound styrene of not less than 3% by weight but not more than 15% by weight and a content of vinyl bond in butadiene portion of not less than 30% but less than 50% and not less than 30 parts by weight of natural rubber and/or polyisoprene rubber, based on 100 parts by weight of total rubber content.

The second aspect of the present invention lies in that the rubber composition containing the branched styrene-butadiene copolymer connected with tin-butadienyl bond, which is obtained by coupling styrene-butadiene copolymer anion with the tin halide compound, is used as the tread base rubber. This results from the fact that such a branched copolymer containing composition considerably improves not only the heat build-up but also fracture properties, particularly breaking strength at high temperature. In the branched copolymer according to the present invention, the crosslink with tin is chemically stable and is hardly subjected to oxidative degradation or the like even at high temperature as compared with the crosslink formed by vulcanization usually used in rubber industry. Furthermore, since molecular chains of copolymers are connected to each other by the coupling reaction to form a starlike polymer, molecular weight therebetween the crosslink points is determined only by the molecular weight of the copolymer before the coupling reaction and the number of copolymer molecules passing the crosslink point is determined by the functionality of the tin halide compound, whereby regular network is formed in the branched copolymer. In other words, the conventional rubber composition containing no branched copolymer has a broad distribution in the molecular weight between crosslink points due to the presence of only irregular crosslink points by the vulcanizing agent such as sulfur or the like, while in the rubber composition containing the branched copolymer the ratio of the molecular weight between particular crosslink points becomes relatively large. These facts are a cause of improving the fracture properties. That is, when external force is applied to the conventional rubber composition containing no branched copolymer, the molecular chain having a low molecular weight between crosslink points is tensioned and strain is concentrated thereon to selectively produce the chain breaking, which results in the lowering of the breaking strength for the composition. This phenomenon is less in the rubber composition containing the branched copolymer, which results in the improvement of the fatigue properties. This fact is considered to be a cause of improving the fatigue properties even at high temperature because the reinforcing action of carbon black is reduced and the crosslink point of sulfur becomes chemically unstable at such high temperature.

In general, when strain is applied to the rubber composition, there are generated enthalpy stress resulting from the reinforcing action of carbon black and entropy stress resulting from the crosslink point. The latter is a stress generating mechanism called as a so-called rubber elasticity and does not substantially follow the energy loss. Therefore, in order to improve the low heat build-up or low rolling resistance, it is sufficient to uniformize the molecular weight between crosslink points and the number of molecules passing the crosslink point or to reduce the number of free terminal chains (molecular chain terminal having no crosslink point), which can be achieved by using the branched copolymer having a crosslinking structure as described above.

In the conventional rubber composition, the vulcanization is usually carried out at high temperature in a short time in order to increase mass production and productivity, during which a so-called reversion produced by the breaking of crosslinked network becomes conspicuous and considerably deteriorates the heat build-up of the composition controlling the low rolling resistance and high-speed durability. On the other hand, according to the present invention, the deterioration of the heat build-up is improved by the use of the rubber composition containing not less than 20 parts by weight of the branched copolymer per 100 parts by weight of total rubber content. When the amount of the branched copolymer is less than 20 parts by weight, the effect of suppressing the reversion cannot be expected.

The effect of suppressing the reversion is excellent in the heat build-up and fracture properties and is further developed when the branched copolymer is used together with natural rubber and polyisoprene rubber exhibiting remarkable reversion. Particularly, the deterioration of the heat build-up due to the reversion is considerably improved when the rubber composition for tread base rubber contains not less than 20 parts by weight of the branched copolymer according to the present invention and not less than 30 parts by weight of at least one of natural rubber and polyisoprene rubber, based on 100 parts by weight of total rubber content. When the amount of at least one of natural rubber and polyisoprene rubber is less than 30 parts by weight, the effect of improving the heat build-up by the synergistic action with the branched copolymer cannot be expected.

Moreover, the rubber composition to be used as the tread base rubber of the tire according to the present invention may contain additives usually used in rubber industry such as vulcanization accelerator, vulcanizing agent, supplement accelerator, carbon black, softener, antioxidant and the like.

The rubber compositions according to the present invention as described above are advantageously applied to anyone of tires having a tread portion of cap/base structure. Particularly, they are favorably used in heavy duty radial tires for truck, bus and construction vehicles as well as radial tires for passenger cars.

The following examples are given in illustration of the invention and are not intended as limitations thereof.

Moreover, various measurements are made by the following methods.

The tensile properties are measured according to the method of JIS K-6301.

The rebound resilience at 70° C. (resilience measured by Dunlop tripsometer) is used as an index for hysteresis loss.

The wear is measured by means of Pico type abrasion machine. The microstructure is determined by an infrared spectrophotometry (Morero's method). Furthermore, the content of bound styrene is determined from a calibration curve based on absorption of phenyl group at 699 cm$^{-1}$ by the infrared spectrophotometry. And also, the ratio of branched polymer connected with tin-carbon bond is determined by a gel permeation chromatography (GPC).

EXAMPLES 1-4, COMPARATIVE EXAMPLES 1-7

Into a reaction vessel of 5 l capacity were charged cyclohexane, 1,3-butadiene, styrene and tetrahydrofuran in predetermined amounts as shown in the following Table 1 under nitrogen atmosphere. After the temperature of the resulting mass was adjusted to the predetermined initiation temperature, n-butyllithium was added to perform polymerization while raising temperature under heat insulation. After 40 minutes, the conversion rate for polymerization reached to 100%.

Then, a small amount of 1,3-butadiene was added to form butadienyllithium in the terminal of the polymer and thereafter tin tetrachloride was added to perform coupling reaction for 30 minutes.

In Example 4, however, the coupling reaction was performed after isothermal polymerization was carried out at 60° C. for 1 hour and a small amount of 1,3-butadiene was added. In Comparative Example 7, the coupling reaction was performed at such a state that the terminal of the polymer is styryl anion without adding additional 1,3-butadiene after the isothermal polymerization.

The resulting polymer solution was added with 2,6-di-tert-butyl p-cresol, subjected to steam stripping to perform the removal of solvent, and dried on a roll heated at 110° C. to obtain a copolymer.

Moreover, Comparative Example 5 used high cis-1,4 polybutadiene (trade name: "BROI") made by Japan Synthetic Rubber Co., Ltd.

The copolymer was mixed with other ingredients according to the compounding recipe shown in the following Table 2 by means of brabender and roll and then vulcanized at 145° C. for 35 minutes.

The properties of the copolymer and vulcanizate are shown in the following Table 3.

TABLE 1

|  | Example 1 | Example 2 | Example 3 | Example 4 | Comparative example 7 | Comparative example 1 | Comparative example 2 | Comparative example 3 | Comparative example 4 | Comparative example 6 |
|---|---|---|---|---|---|---|---|---|---|---|
| Cyclohexane (g) | 2,250 | 2,250 | 2,250 | 3,500 | 3,500 | 2,250 | 2,250 | 2,250 | 2,250 | 2,250 |
| 1,3-butadiene (g) | 470 | 445 | 420 | 445 | 445 | 500 | 345 | 445 | 445 | 445 |
| Styrene (g) | 25 | 50 | 75 | 50 | 50 | 0 | 150 | 50 | 50 | 50 |
| Tetrahydrofuran (g) | 4.5 | 4.5 | 4.5 | 10.0 | 10.0 | 4.5 | 4.5 | 22.5 | 1.1 | 4.5 |
| n-Butyllithium (g) | 0.30 | 0.31 | 0.33 | 0.32 | 0.33 | 0.30 | 0.33 | 0.31 | 0.31 | 0.31 |
| Polymerization temperature (°C.)* | 30→100 | 30→100 | 30→98 | 60 | 60 | 30→100 | 30→100 | 30→95 | 20→90 | 30→98 |
| Conversion rate (%) | 100 | 100 | 100 | 100 | 100 | 100 | 100 | 100 | 100 | 100 |
| Additionally added butadiene (g) | 5 | 5 | 5 | 5 | 0 | 0 | 5 | 5 | 5 | 5 |
| Coupling agent $SnCl_4$ (g) | 0.15 | 0.15 | 0.15 | 0.15 | 0.16 | 0.15 | 0.15 | 0.15 | 0.15 | 0.035 |

*Numerical values show polymerization initiation temperature → maximum access temperature.
Example 4 is an isothermal polymerization.

TABLE 2

|  | Part by weight |
|---|---|
| Styrene-butadiene copolymer | 100 |
| Carbon black HAF | 50 |
| Stearic acid | 1 |
| Zinc white | 3 |
| Sulfur | 1.75 |
| Vulcanization accelerator NS* | 1 |

*n-tert-butyl-2-benzothiazyl sulfenamide

TABLE 3

|  | Example 1 | Example 2 | Example 3 | Example 4 | Comparative example 7 | Comparative example 1 |
|---|---|---|---|---|---|---|
| Mooney viscosity ($ML_{1+4}$ 100° C.) | 54 | 56 | 55 | 54 | 55 | 56 |
| Bound styrene (%) | 5 | 10 | 15 | 10 | 10 | 0 |
| Microstructure (%) cis/vinyl/trans | 23/42/35 | 23/41/36 | 22/41/37 | 23/41/36 | 23/41/36 | 23/42/35 |
| Ratio of polymer having tin-butadienyl bond (%) | 54 | 53 | 50 | 50 | 0 (54**) | 55 |
| Mooney viscosity of composition ($ML_{1+4}$ 100° C.) | 62 | 62 | 63 | 63 | 67 | 64 |
| Properties of vulcanizate |  |  |  |  |  |  |
| 300% modulus (kg · f/cm$^2$) | 145 | 150 | 151 | 147 | 150 | 140 |
| Tensile strength (kg · f/cm$^2$) | 200 | 220 | 245 | 215 | 200 | 180 |
| Elongation (%) | 480 | 470 | 460 | 470 | 460 | 450 |
| Hardness (JIS-A) | 65 | 66 | 67 | 66 | 66 | 65 |
| Rebound resilience 70° C. (%) | 74 | 73 | 72 | 72 | 69 | 72 |
| Pico wear* (indicated by index) | 105 | 105 | 110 | 105 | 105 | 100 |

|  | Comparative example 2 | Comparative example 3 | Comparative example 4 | Comparative example 5 | Comparative example 6 |
|---|---|---|---|---|---|
| Mooney viscosity ($ML_{1+4}$ 100° C.) | 53 | 55 | 54 | 50 | 55 |
| Bound styrene (%) | 30 | 10 | 10 | 0 | 10 |
| Microstructure (%) cis/vinyl/trans | 24/41/35 | 8/70/22 | 30/20/50 | 95/2/3 | 23/41/36 |
| Ratio of polymer having tin-butadienyl bond (%) | 54 | 53 | 52 | 0 | 15 |
| Mooney viscosity of composition ($ML_{1+4}$ 100° C.) | 65 | 62 | 65 | 72 | 78 |
| Properties of vulcanizate |  |  |  |  |  |
| 300% modulus (kg · f/cm$^2$) | 163 | 170 | 174 | 140 | 130 |
| Tensile strength (kg · f/cm$^2$) | 255 | 200 | 220 | 190 | 180 |
| Elongation (%) | 440 | 370 | 360 | 630 | 450 |
| Hardness (JIS-A) | 70 | 66 | 66 | 68 | 66 |
| Rebound resilience 70° C. (%) | 65 | 68 | 68 | 65 | 66 |
| Pico wear* (indicated by index) | 110 | 90 | 95 | 105 | 95 |

*Index value on the basis that Comparative example 1 is 100. The larger the index value, the better the property.
**Tin-styryl bond As apparent from Table 3, the copolymers of Examples 1-4 are superior in the tensile strength (fracture property) to the copolymer of Comparative Example 1 and are excellent in the elongation as compared with Comparative Example 3. Further, they are excellent in the rebound resilienc at 70° C. as compared with Comparative Examples 2-7.

The copolymers of Examples 1-4 are superior in the wear resistance to those of Comparative Examples 1, 3, 4 and 6. And also, they are low in the Mooney viscosity of their composition as compared with that of Comparative Example 6 and are excellent in the processability.

EXAMPLE 5

The copolymer of each of Example 1 and Comparative Example 5 was mixed with other ingredients according to the compounding recipe shown in the following Table 4 and then vulcanized, during which optimum vulcanizing times at 145° C. and 165° C. were determined by means of a curelastometer. Then, loss percentages in tensile stress and tensile strength between the vulcanizate after the optimum vulcanizing time and the vulcanizate after the vulcanizing time corresponding to 3 times the optimum vulcanizing time were measured as a reversion to obtain results as shown in the following Table 5.

From the data of Table 5, it is apparent that no reversion occurs in Example 1.

TABLE 4

|  | Part by weight |
|---|---|
| Natural rubber (RSS #1) | 50 |
| Copolymer of Example 1 or Comparative Example 5 | 50 |
| Carbon black HAF | 50 |
| Stearic acid | 1 |
| Zinc white | 3 |
| Sulfur | 1.75 |
| Vulcanization accelerator | 1 |

TABLE 5

|  | Copolymer of Example 1 | | Copolymer of Comparative example 5 | |
|---|---|---|---|---|
| Vulcanization temperature (°C.) | 145 | 165 | 145 | 165 |
| Loss in tensile stress (%) | 1 | 3 | 13 | 24 |
| Loss in tensile strength (%) | 1 | 2 | 16 | 30 |

EXAMPLE 7

In this example, there were prepared and used the following copolymers A-F. The copolymers A and B corresponded to Examples 1 and 2, respectively. The copolymer C was obtained by the same polymerization and coupling reaction as described in Example 1 except for the use of 420 g 1,3-butadiene, 75 g of styrene, 4.0 g of tetrahydrofuran and 0.32 g of n-butyllithium. The copolymer D corresponded to Comparative Example 1. The copolymer E was obtained by the same polymerization as described in Example 2 without performing the coupling reaction butadienyllithium in the terminal of the polymer. The copolymer F was obtained by the same polymerization as described in Comparative Example 7.

The content of bound styrene, content of vinyl bond in butadiene portion and ratio of polymer containing tin-butadienyl bond were measured with respect to these copolymers to obtain results as shown in the following Table 6.

TABLE 6

| Kind of copolymer | A | B | C | D | E | F |
|---|---|---|---|---|---|---|
| Content of bound styrene (wt. %) | 5 | 10 | 15 | 0 | 10 | 25 |
| Content of vinyl bond (wt. %) | 42 | 41 | 36 | 42 | 41 | 36 |
| Ratio of polymer containing tin-butadienyl bond (wt. %) | 54 | 53 | 50 | 55 | 0 | 0 |

According to the present invention, it is necessary that the ratio of polymer connected with tin-butadienyl bond in the branched copolymer is at least 20% by weight, preferably not less than 40% by weight. In this connection, all of the copolymers according to the present invention shown in Table 6 had the ratio of not less than 50% by weight and exhibited a good coupling efficiency.

Then, a rubber composition containing each of the copolymers A-F was prepared according to the compounding recipe shown in the following Table 7 and used as a tread base rubber to manufacture a radial tire having a tire size of 165 SR 13. The rolling resistance and high-speed durability were measured with respect to such a tire to obtain results as shown in the following Table 8.

Moreover, the evaluations of these properties were made as follows:

Rolling resistance

The test tire subjected to an internal pressure of 1.7 kg/cm$^2$ was trained on a steel drum with a diameter of 1,707.6 mm and a width of 350 mm, which was rotated by the driving of a motor, at a speed of 80 km/hr under JIS 100% load (385 kg) for 30 minutes and thereafter the rotating speed of the drum was raised to 100 km/hr. Then, the driving of the motor was stopped to run the drum by inertia, during which the rolling resistance of the tire to the drum was measured on a basis of deceleration speed of drum and time change. The rolling resistance was indicated by an index according to the following equation on the basis that the tire of Tire No. 11 is 100 (which corresponds to the rolling resistance of 5.0 kg). The smaller the index value, the better the property.

$$\frac{\text{Rolling resistance of test tire}}{5.0 \text{ kg}} \times 100$$

High-speed durability

The measurement was performed according to a method of FMVSS No. 109, wherein the running speed of the test tire was stepped up in the order of 140 km/hr, 150 km/hr, 160 km/hr, 170 km/hr, 180 km/hr, 185 km/hr, 190 km/hr, 195 km/hr, 200 km/hr and 205 km/hr every 30 minutes. The high-speed durability was indicated by a step speed in the breaking of the test tire and a lapse time at this step speed.

TABLE 7

| Composition No. | 1-6 | 7-8 | 9 | 10 | 11 |
|---|---|---|---|---|---|
| Copolymer of Table 6 | 35 | 45 | 60 | 10 | 100 |
| Natural rubber (RSS #4) | 35 | 25 | — | — | — |
| Polyisoprene rubber *1 | — | 10 | 20 | 60 | — |
| Polybutadiene rubber *2 | 30 | 20 | 20 | 30 | — |
| Carbon black HAF | 40 | 40 | 40 | 40 | 60 |

TABLE 7-continued

| Composition No. | 1–6 | 7–8 | 9 | 10 | 11 |
|---|---|---|---|---|---|
| Softener, aromatic oil | 3 | 3 | 3 | 3 | 20 |
| Antioxidant *3 | 1 | 1 | 1 | 1 | 1 |
| Stearic acid | 2 | 2 | 2 | 2 | 2 |
| Zinc white | 4 | 4 | 4 | 4 | 4 |
| Sulfur | 2.5 | 2.5 | 2.5 | 2.5 | 1.5 |
| Vulcanization accelerator *4 | 1 | 1 | 1 | 1 | 1 |

*1: IR-2200, made by Japan Synthetic Rubber Co., Ltd.
*2: BR-01, made by Japan Synthetic Rubber Co., Ltd.
*3: N—phenyl-N'—isopropyl-p-phenylenediamine
*4: N—oxydiethylene-2-benzothiazylsulfenamide

TABLE 8

| | Tire No. | | | | | | | | | | |
|---|---|---|---|---|---|---|---|---|---|---|---|
| | 1 Example | 2 Example | 3 Example | 4 Comparative example | 5 Comparative example | 6 Comparative example | 7 Example | 8 Comparative example | 9 Example | 10 Comparative example | 11 Comparative example |
| Compounding recipe for tread base rubber — Composition No. | 1 | 2 | 3 | 4 | 5 | 6 | 7 | 8 | 9 | 10 | 11 |
| Kind of copolymer | A | B | C | D | E | F | B | F | B | B | F |
| Rolling resistance | 87 | 88 | 89 | 94 | 95 | 96 | 89 | 96 | 92 | 94 | 100 |
| High-speed durability step speed (km/hr) × time (min) | 200 × 27' | 200 × 20' | 200 × 14' | 190 × 16' | 190 × 9' | 195 × 3' | 200 × 4' | 190 × 28' | 195 × 18' | 195 × 7' | 185 × 26' |

Note:
In anyone of tire Nos. 1–11, the rubber composition of Composition No. 11 was used as a tread cap rubber for tire.

As apparent from the data of Table 8, the rolling resistance and high-speed durability are considerably improved in the pneumatic tire according to the present invention.

What is claimed is:

1. A branched styrene-butadiene copolymer obtained by coupling an active styrene-butadiene copolymer anion, prepared by the process comprising (a) polymerizing styrene and butadiene in the presence of ether or a tertiary amine and an initiator of an organolithium compound in a hydrocarbon solvent, (b) adding 1 to 20 mole of 1,3 butadiene per 1 gram atom of lithium in the initiator to the resulting polymer of step (a), and (c) coupling the resulting styrene butadiene copolymer of step (b) with a tin halide compound, wherein :
   (I) a content of branched copolymer connected with tin-butadienyl bond in said copolymer is at least 20% by weight;
   (II) a content of bound styrene in said copolymer is not less than 3% by weight but less than 25% by weight; and
   (III) a content of vinyl bond in the butadiene portion of said copolymer is not less than 30% but less than 50%.

2. A branched styrene-butadiene copolymer according to claim 1, wherein said content of bound styrene is 3 to 15% by weight.

3. A branched stryene-butadiene copolymer according to claim 1, wherein said content of bound styrene is 5 to 15% by weight.

4. A branched styrene-butadiene copolymer according to claim 1, wherein the initial polymerization temperature is 0°–50° C., the maximum access temperature is not more than 120° C. and the rising of polymerization temperature from the polymerization initiation temperature is at least 30° C.

* * * * *

UNITED STATES PATENT AND TRADEMARK OFFICE
CERTIFICATE OF CORRECTION

PATENT NO. : 4,526,934

DATED : July 2, 1985

INVENTOR(S) : Noboru Oshima, Isamu Shimizu, Yoshito Yoshimura, Tatsuo Fujimaki, Seisuke Tomita It is certified that error appears in the above-identified patent and that said Letters Patent is hereby corrected as shown below:

On the title page:

On line [73] of the patent, after "Bridgestone Tire Company Limited" insert --and Japan Synthetic Rubber Co., Ltd.--

Signed and Sealed this

Twenty-first Day of October, 1986

[SEAL]

*Attest:*

DONALD J. QUIGG

*Attesting Officer*   *Commissioner of Patents and Trademarks*